(12) United States Patent
Doll (10) Patent No.: US 9,452,853 B2
(45) Date of Patent: Sep. 27, 2016

(54) APPARATUS FOR FORMING PACKAGES USING NON-LINEAR SEALING JAWS

(75) Inventor: Paul E. Doll, Madison, WI (US)

(73) Assignee: Kraft Foods Group Brands LLC, Chicago, IL (US)

(*) Notice: Subject to any disclaimer, the term of this patent is extended or adjusted under 35 U.S.C. 154(b) by 1503 days.

(21) Appl. No.: 12/833,576

(22) Filed: Jul. 9, 2010

(65) Prior Publication Data
US 2012/0005993 A1 Jan. 12, 2012

(51) Int. Cl.
- *B65B 51/30* (2006.01)
- *B29C 65/00* (2006.01)
- *B65B 9/067* (2012.01)
- *B65B 9/073* (2012.01)
- *B29C 65/02* (2006.01)
- *B29C 65/18* (2006.01)

(52) U.S. Cl.
CPC ........... *B65B 51/30* (2013.01); *B29C 66/0042* (2013.01); *B29C 66/1122* (2013.01); *B29C 66/344* (2013.01); *B29C 66/4312* (2013.01); *B29C 66/81421* (2013.01); *B29C 66/81422* (2013.01); *B29C 66/81423* (2013.01); *B29C 66/81457* (2013.01); *B29C 66/849* (2013.01); *B65B 9/067* (2013.01); *B65B 9/073* (2013.01); *B29C 65/02* (2013.01); *B29C 65/18* (2013.01); *B29C 66/0044* (2013.01)

(58) Field of Classification Search
CPC ..... B65B 51/14; B65B 51/30; B65B 51/146; B29C 66/81421; B29C 66/81422; B29C 66/81423; B29C 66/343; B29C 66/344
USPC ................. 53/550, 568, 373.6, 373.7, 374.2; 156/581, 583.1; D15/146; 219/243
IPC ............................................. B65B 51/14,51/30
See application file for complete search history.

(56) References Cited

U.S. PATENT DOCUMENTS

| | | | |
|---|---|---|---|
| 1,285,087 A * | 11/1918 | Fay | 156/583.1 |
| 1,488,504 A * | 4/1924 | Keyes | 156/206 |
| 2,276,083 A * | 3/1942 | Moeller | 156/581 |
| 3,338,767 A * | 8/1967 | Fuller | 156/581 |
| 4,001,075 A | 1/1977 | Menzner | |
| 4,079,570 A * | 3/1978 | Rucker | 156/581 |
| 4,582,555 A | 4/1986 | Bower | |

(Continued)

FOREIGN PATENT DOCUMENTS

EP 1241098 A1 * 9/2002 ............. B65B 51/30

*Primary Examiner* — Stephen F Gerrity
(74) *Attorney, Agent, or Firm* — Fitch, Even, Tabin & Flannery LLP (57) ABSTRACT

New and improved seal jaws and methods for creating a seal on a package containing a high-profile product therein are described herein. The seal jaws are configured to seal overlapping wrapping film segments together adjacent the product in a seal zone where the height of the product results in additional film width. The height of the product creates an inward pull that can prevent the additional film width from being taut, which can result in folds or wrinkles in a subsequently formed seal. Advantageously, the seal jaws described herein have a non-linear configuration that provides extra sealing surface area as compared to linear surfaces over the same lateral distance. The extra sealing surface is provided by an array of curvilinear peaks and valleys, where the peaks tension the overlapping film segments in the seal zone to substantially prevent the additional film width from forming folds in a subsequently formed seal.

5 Claims, 4 Drawing Sheets

(56) References Cited

U.S. PATENT DOCUMENTS

| | | | |
|---|---|---|---|
| 4,682,976 A * | 7/1987 | Martin et al. | 53/551 |
| 4,943,339 A * | 7/1990 | Ernest | 156/581 |
| 4,949,846 A | 8/1990 | Lakey | |
| 5,015,223 A | 5/1991 | Boeckmann | |
| 5,021,117 A | 6/1991 | Boeckmann | |
| 5,076,040 A | 12/1991 | Davis | |
| 5,419,801 A | 5/1995 | McDonald | |
| 6,230,781 B1 * | 5/2001 | Smith | 156/581 |
| 6,379,483 B1 * | 4/2002 | Eriksson | 156/73.1 |
| 6,562,166 B2 * | 5/2003 | Molander et al. | 156/73.1 |
| 2004/0089407 A1 * | 5/2004 | Halewood | 156/581 |

* cited by examiner

APPARATUS FOR FORMING PACKAGES USING NON-LINEAR SEALING JAWS

FIELD

This disclosure relates to food packages and forming equipment therefore, and in particular, sealing jaws for use in forming such packages.

BACKGROUND

In one known package, a continuously-flowing film of wrapping material is manipulated around the articles and sealed to enclose individual (or multiple) articles therein. This type of package can include forming a continuous longitudinal fin seal to longitudinally wrap the material around the articles. End seals can then be formed transversely across the wrapping material with the fin seal extending therebetween. Areas between adjacent flow wrapped articles and coextensive with the end seals can then be cut to singulate the packages.

End seals of such a package can be formed using sealing jaws that clamp the wrapping material adjacent to the articles to apply pressure and heat to seal the layered wrapping material together. One type of sealing jaws use substantially flat sealing surfaces. Another type of sealing jaws use sealing surfaces that have surfaces with non-linear features that extend transversely to the fin seal and parallel to the side edges of the seal jaws, such as the sealing jaws described in U.S. Pat. Nos. 4,001,075, 4,949,846, and 5,015,223.

Such packages can be utilized to store a variety of articles having a variety of shapes and sizes. When an article has a high profile, the package includes wrapping material to accommodate the width, as well as the height of the article. The width of the package at the food product can be less than at the ends spaced from the food product because the high profile food product can draw in the package film at its width. Stated a different way, the wrapping material accommodating the height of the article transitions to additional width at the end seal. This additional width, however, can deflect vertically as a result of proximity to the high-profile food product. As discussed above, opposing seal jaws clamp the layered packaging material together to create the seal. Disadvantageously, traditional sealing jaws using substantially flat sealing surfaces or non-linear features running parallel to the side edges of the seal jaws can create folds or wrinkles in the end seal during formation thereof because these traditional seal jaws simply clamp down on the vertically deflected additional width, which can fold over such additional width rather than pressing it into alignment with the rest of the end seal.

SUMMARY

In accordance there is provided a new improved method and apparatus for creating seals across a package having a high-profile product therein. This is achieved by using sealing jaws having complementary non-linear sealing surfaces, which advantageously provide a seal between overlapping layers of wrapping material substantially without folds adjacent the high-profile. The non-linear sealing surfaces of the sealing jaws described herein have more sealing surface area than flat sealing jaws over the same lateral width. Additionally, the non-linear sealing surfaces tension portions of the overlapping layers to accommodate the additional width of packaging material adjacent the high-profile product and create a substantially taut seal zone prior to formation of a seal.

The non-linear sealing surfaces of the sealing jaws achieve this result by creating additional surface area when compared to a linear sealing surface over the same lateral length. In one form, the non-linear sealing surfaces include complementary curvilinear peaks and valleys that when closed onto overlapping layers of wrapping film tension the film into the valleys. Tensioning the film spreads it out over the additional surface area to avoid folds within a subsequently created seal.

In one form, the pair of mating sealing jaws are described to form a seal between opposing plastic film segments. One of the pair of sealing jaws has a non-linear sealing surface with between two and eight curvilinear peaks that are separated by curvilinear valleys. The other of the pair of sealing jaws has a complementary, non-linear sealing surface.

In another form, a method of packaging a high-profile food product is described herein. The method includes placing a high-profile food product on a packaging film. The film is then folded to bring opposing longitudinal edges thereof generally toward each other such that the high-profile food product is overlapped by the film in a longitudinal direction. The longitudinal edges of the film are then sealed together to form a tube with the high-profile food product enclosed therein. The tube includes a seal zone that extends transversely across the tube between the longitudinal edges having overlapping film layers adjacent the high-profile food product. The seal zone is tensioned using opposing, non-linear and complementary sealing surfaces and a cross seal is subsequently formed at the sealing zone to close an end of the tube. The opposing, non-linear and complementary sealing surfaces can form the cross seal using features as described in the pair of mating sealing jaws above.

In one example, the pair of mating sealing jaws can include non-linear seal surfaces configured so that they have between 0.16 and 0.18 inches of extra travel per linear inch as compared to linear sealing surfaces over the same distance. The pair of sealing jaws described herein can also be used in combination with a form, fill, and seal machine, such as a machine with a vertical or horizontal feed direction.

DETAILED DESCRIPTION

New and improved non-linear seal jaws 10 and methods for creating a seal 12 on a package 14 containing a high-profile product 16 therein are described herein. The non-linear seal jaws 10 are configured to seal overlapping wrapping film segments 18 together adjacent the high-profile product 16 in a seal zone 20 where the height of the high-profile product 16 results in extra wrapping film width 2 that is deflected from a flat configuration by the height of the high-profile product 16. The height of the product 16 creates an inward pull that can prevent the extra film 2 from having a taut configuration, which can result in folds or wrinkles 4 in the subsequently formed seal 12. Advantageously, the non-linear configuration of the seal-jaws 10 described herein provides extra sealing surface area as compared to linear sealing surfaces 6 over the same lateral distance W. The extra sealing surface is provided by an array of curvilinear peaks 22 and valleys 24, where the peaks 22 tension the overlapping film segments 18 in the seal zone 20 to substantially prevent the extra width 2 from forming folds 4 in a subsequently formed seal 12.

More specifically, with the processes described herein, a high-profile food product 16 is positioned between the opposing wrapping film segments 18 connected at edges 26 of the package 14, which can include two seals, a seal and a fold, or two folds as discussed below. The cross-seal 12 is then created to extend between the edges 26 to create a sealed interior 28 enclosing the food product 16. Due to the costs involved, it is desirable to minimize the amount of packaging film 18 used for each package 14, so the cross seals 12 and the edges 26 are preferably formed closely adjacent the food product 16. This, however, places the seals 12 in an area where the height of the food product 16 within the package 14 creates excess width 2, but also pulls this excess width film inward and upward/downward so that it does not lie flat and instead deflects out of alignment with adjacent portions of wrapping film. Traditional linear seal jaws 6 clamp down on the packaging film in this area including the deflected portions, which can cause the deflected portions to simply fold over or crease rather than stretch out to create a clean seal.

For illustrative and exemplary purposes, a package 14 having a longitudinal fold 30 and fin seal 32 as its edges 26 is shown in the figures and described below; however, other packages are equally applicable to the methods and apparatus described herein.

Referring now to the figures, exemplary non-linear seal jaws 10 are described herein that form a substantially crease-free cross-seal 12 in a package 14 containing a high-profile food product 16, such as having a cumulative height of 0.75 inch or more and a cumulative width equal to or greater than the height.

Figure 1:
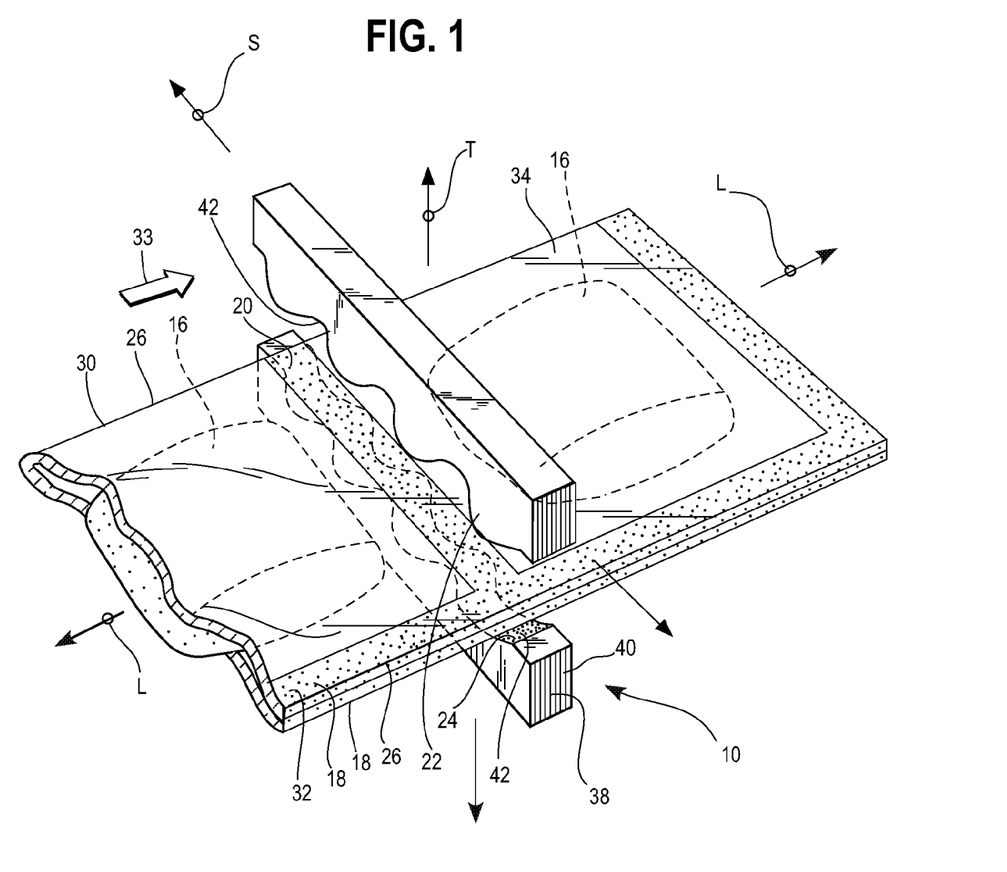
FIG. 1 is a perspective view of non-linear seal jaws positioned above and below packaging film having high-profile products therein.
Figure 2:
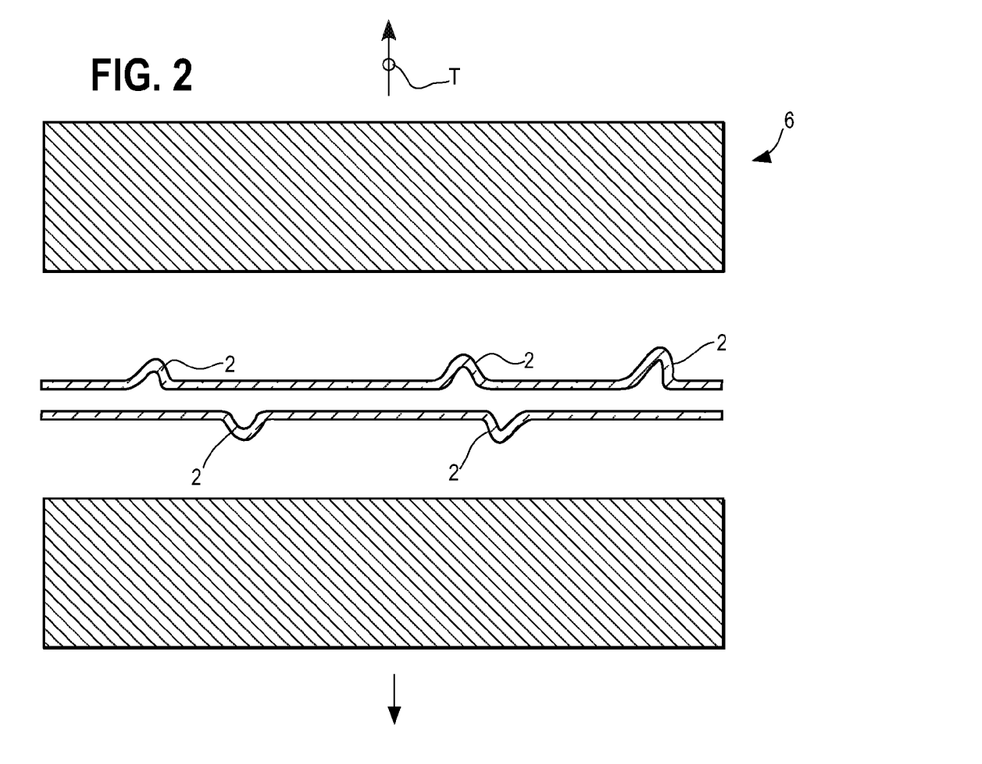
FIG. 2 is a front elevational view of linear seal jaws positioned above and below a seal zone of opposing film segments adjacent a high-profile product showing the seal jaws in an open position and the opposing film segments having vertical deflections therein.
Figure 3:
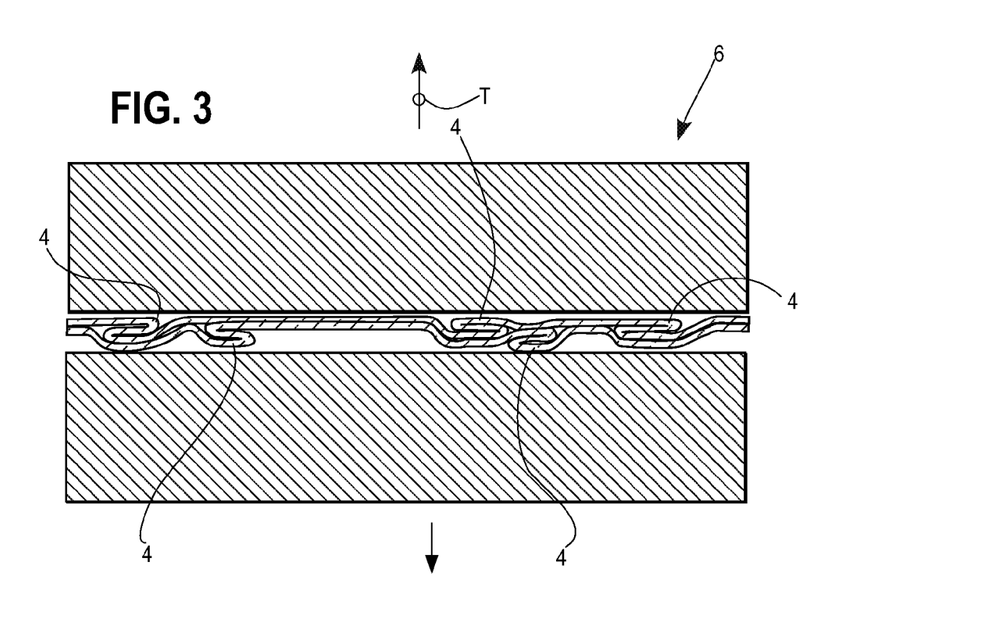
FIG. 3 is a front elevational view of the linear seal jaws and opposing film segments of FIG. 2 showing the linear seal jaws in a sealing position and the opposing film segments having folds therein.

As shown in FIG. 1, the seal jaws 10 extend along a seal axis S. The package 14 extends along a longitudinal axis L that is generally transverse to the seal axis S. The package 14 is inserted between the seal jaws 10 in a flow stream direction extending generally parallel to the longitudinal axis L, such as indicated by arrow 35. As described above, before being inserted between the seal jaws 10, the package 14 has a generally tubular shape, which in the illustrated form is created by folding a packaging film 34 about the longitudinal axis L so that longitudinal edge portions 36 of the packaging film 34 generally overlap. The longitudinal edge portions 36 are then sealed together using any suitable process, including for example, a heat sealing, cold sealing, or induction sealing process, to create the fin seal 32. Accordingly, the fold or bend 30 is positioned opposite the fin seal 32 so that the fold 30 and the fin seal 32 each form one of the side edges 26 of the package 14. So formed, the package 14 having a tubular shape as described is inserted between the seal jaws 10 so that the seal jaws 10 can create the cross-seal 12 extending between the side edges 26 of the package 14 along the seal axis S.

The non-linear seal jaws 10 include a bottom jaw 38 and a top jaw 40, each having a non-linear sealing surface 42. Bottom and top are with reference to the figures rather than an indication of application. The non-linear seal jaws 10 described herein can be applied horizontally, vertically, or at an angle as desired or required by a particular application. The bottom and top jaws 38, 40 are configured to translate toward each other along a translation axis T. The non-linear sealing surfaces 42 of the bottom and top jaws 38, 40 create additional surface area over traditional flat sealing jaws. Preferably, the extra travel per lateral inch of the non-linear sealing surfaces 42 as compared to a flat sealing surface is approximately equal to the total excess film distance divided by the width of the product. In one example, this equals between about 0.14 inch and about 0.20 inches per linear inch, and more preferably between about 0.16 inch and 0.18 inch. When the overlapping film segments 18 are placed therebetween, the bottom and top jaws 38, 40 clamp down onto the overlapping wrapping film segments 18 to apply pressure, and optionally heat, to form the seal 12 between the film segments 18. As shown, the bottom and top jaws 38, 40 each include an array of the curvilinear peaks 22 and valleys 24 positioned along the seal axis S. The non-linear seal jaws 10 preferably include between 2 and 8 peaks 22 and valleys 24, and more preferably, between 3 and 5.

Additionally, the bottom jaw peaks 22 are preferably generally complementary to the top jaw valleys 24 and vice versa. More preferably, the bottom and top jaws 38, 40 are substantially complementary so that practically all of the sealing surfaces 42 contact film wrapping material 22 when creating a seal.

Figure 4:
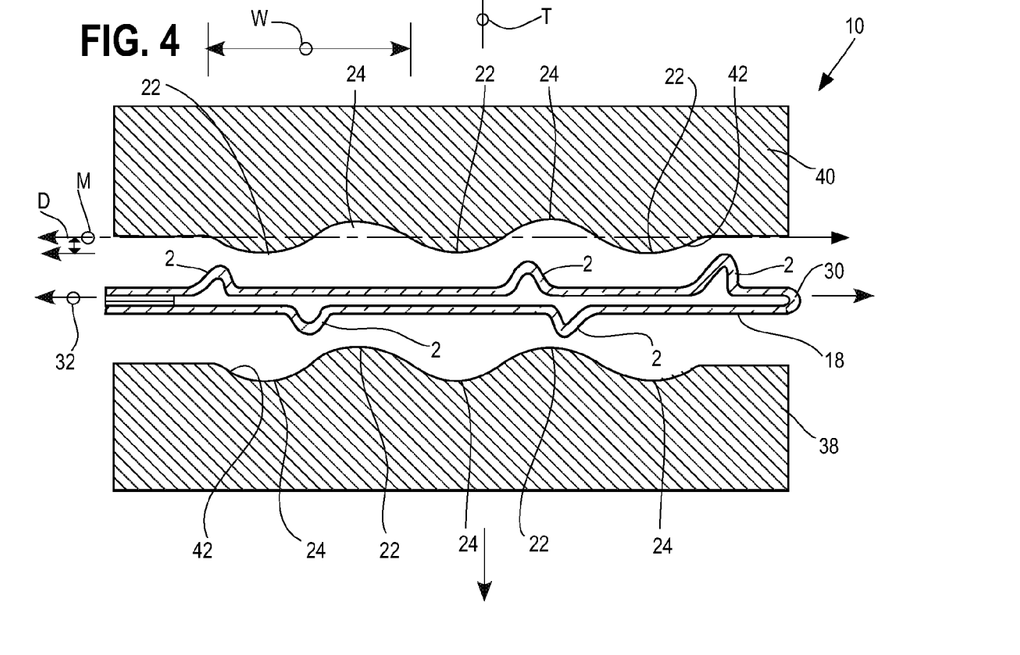
FIG. 4 is a front elevational view of non-linear seal jaws positioned above and below a seal zone of opposing film segments adjacent a high-profile product showing the non-linear seal jaws in an open position and the opposing film segments having vertical deflections therein.
Figure 5:
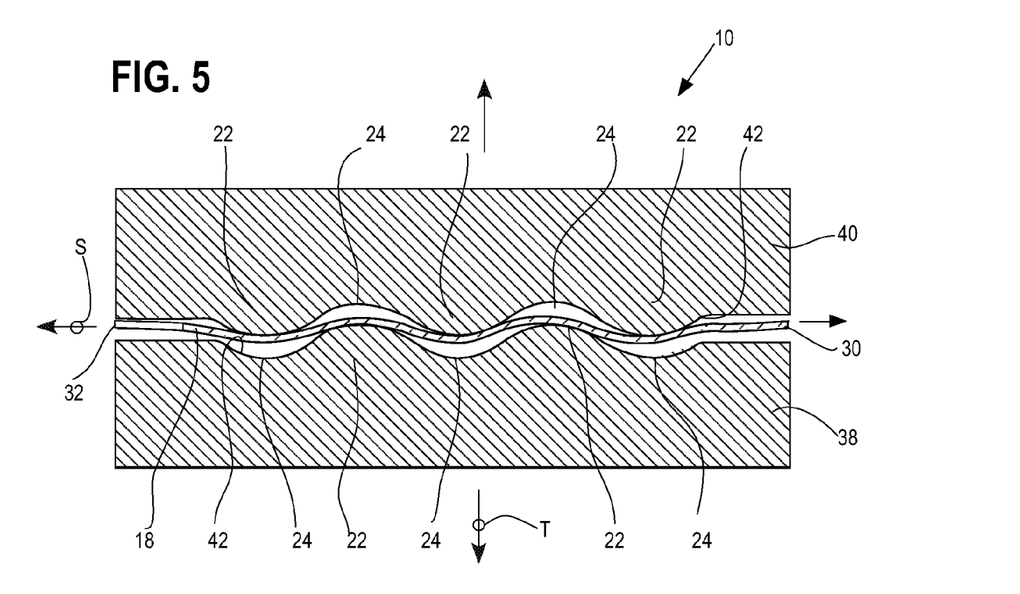
FIG. 5 is a front elevational view of the non-linear seal jaws and opposing film segments of FIG. 4 showing the non-linear seal jaws in a sealing position and the opposing film segments being substantially taut.

As the bottom and top seal jaws 38, 40 close on the overlapping film segments 18, the peaks 22 positioned on the bottom and top seal jaws 38, 40 tension the overlapping film segments 18 so that any portion of the film segments 18 that previously deflected out of alignment with the remaining portions of the film segments lying along the seal axis S are drawn into alignment. The non-linear seal jaws 10 tension the overlapping film segments 18 so that the overlapping film segments 18 are generally taut during creation of the cross seal 12, which substantially prevents the occurrence of the folds or wrinkles 4 in the created cross seal 12.

The peaks and valleys 22, 24 are preferably curvilinear so that any force imparted onto the overlapping film segments 18 by the tensioning is spread out over the curve of the peak 22 rather than a single line that an edge would create. More preferably, the sealing surfaces 42 form a wave along the seal axis S so that no edges contact the film segments 18 when creating the seal 12. This structure provides a continuous surface that does not create force focus points that an edge would create.

As testing has shown, the height of the peaks 22 and the depth of the valleys 24 a preferred range. Too small of a value does not solve the issue of folds or wrinkles in the seal on one end and too high a value stretches the packaging film on the other end. Peaks that are too short do not tension the film sufficiently to bring the extra width into alignment with the rest of the seal zone. On the other hand, peaks that are too tall stretch the adjacent film segment as it is required to travel the down the food product and then further down into the valley 24 of the sealing jaws 10.

By one approach, the peaks 22 and valleys 24 of the non-linear seal jaws 10 are part of a sinusoidal wave. Accordingly, each peak 22 and valley 24 have a depth D that is substantially equal. Preferably, the depth D of the peaks 22 and valleys 24 is between 0.09 inch and 0.25 inch as measured from a median line M extending linearly between the peaks 22 and valleys 24. Similarly, the peaks 22 and valleys 24 occur along a constant frequency with a constant wavelength W. Preferably, the wavelength W of the peaks 22 and valleys 24 is between about 0.5 inch and about 2.5 inches with a frequency between about two peaks and valleys 24 per inch and about one peak 22 and valley 24 per inch. By another approach, the peaks 22 and valleys 24 can have a variable wavelength and/or frequency, with a higher frequency generally centrally located or a frequency that increases toward a middle section of the sealing jaws.

By one approach, the non-linear sealing surfaces 42 of the bottom and top jaws 38, 40 can include a non-stick layer or coating 44 disposed thereon. Due to the heat and products involved in creating seals on packaging film, sometimes film can stick to the sealing surfaces 42. This disadvantageously can resist the tensioning provided by the non-linear sealing surfaces 42. In order to substantially prevent such sticking from occurring, the non-stick layer or coating 44 can be disposed on the bottom and top sealing jaws 38, 40 so that the film segments 18 slide along the sealing surfaces 42 allowing the seal zone 20 to be tensioned. The non-stick layer or coating 44 can include a Teflon coating or tape applied to the sealing surfaces 42, or the like.

By another approach, a layer or coating of elastic, compliant, heat transmitting material, such as rubber or the like, can be disposed on or applied to at least one of the jaw sealing surfaces 42. The material can have a thickness of about 0.125 inch, which allows its elasticity to accommodate for irregularities in the fit between the sealing surfaces 42 and thereby provide sealing pressure and heating across portions of the package seal zone 20 between the irregularities. This material can also be used in combination with the non-stick layer 44 discussed above.

There are several types of packages that utilize cross seals to form a seal edge of the package. One such type of package includes a fin seal running across a face of the package to create a tubular form to enclose the food product. Cross seals are then formed on forward and rearward ends of the package to seal in the food product. Edges are cut through the end seals to singulate the individual packages. Another type of package includes a fin seal forming a longitudinal edge of the package with a fold forming the other longitudinal edge, as described above. Cross seals are then formed on forward and rearward ends of the package to seal in the food product. Yet another type of package has fin seals on both longitudinal edges with cross seals extending therebetween.

Figure 6:
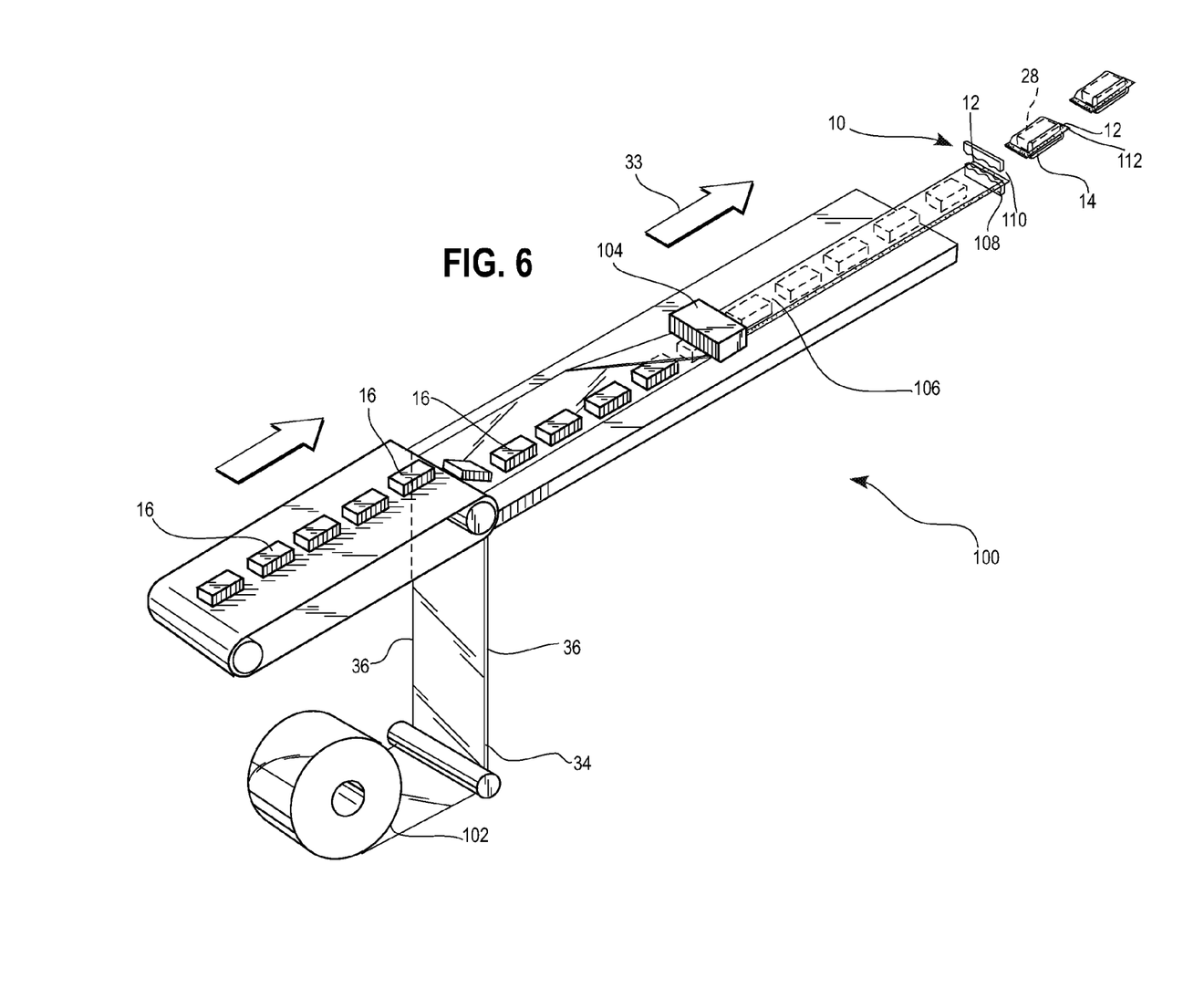
FIG. 6 is a schematic perspective view of a horizontal form, fill, and seal machine utilizing the non-linear seal jaws of FIG. 1.

By one approach, the package is formed utilizing horizontal form, fill, and seal machinery 100. In this process, a continuous roll of packaging film 102 is unrolled and products 16 are deposited thereon. The film is then manipulated to a tubular shape around the products 16 by manipulating the film about the longitudinal axis L so that the lateral edge portions 36 generally align and the film overlaps the products 16. Once aligned, pressure, and optionally heat, is applied to the lateral edge portions by a fin seal station 104, which can including opposing pin wheels, a seal jaw, or the like, thereby creating the fin seal 32 between the lateral edge portions 36. The fin seal station 102 forms a tube 106 of packaging film that longitudinally extends around the products 16. A cross seal station 108 is positioned downstream of the fin seal station 102 to form the cross seals 12 on the package 14. The cross seal station 108 can include the non-linear seal jaws 10 as described herein, which close onto the tube 106 between adjacent products 16 to create the cross-seal 12 and ends of adjacent packages. By one approach, the thickness of the non-linear seal jaws 10 is sized to form cross-seals on adjacent packages with sufficient width to accommodate a cutting apparatus, such as a knife, die, rolling die, or the like. In one example, where a end package having cross seals of about 0.375 inch and a knife of about 0.125 inch, the jaws 10 can have a thickness of about 1 inch. This seal 12 is then cut to form a rearward seal 110 in the leading package and a forward seal 112 in the trailing package. The cut can be made at the cross seal station 108 or at an additional cutting station. The combination of the end seals 12 and the fin seal 32 creates a hermetically sealed package 14, which can be utilized to store, transport, and display the high-profile food product 16 for sale.

An alternative process utilizes vertical form, fill, and seal machinery. In this case, the film is manipulated into a vertically aligned shape and the fin seal is formed as described above. The non-linear seal jaws 10 then create the forward and rearward seals as described above. In this case, however, the food product is deposited into the package after creation of the forward cross seal. The film is then fed in the feed direction and the non-linear seal jaws create the rearward cross seal to seal the package.

Although generally continuous-manufacturing processes are described, the processes can be discontinuous, with some of the steps occurring on different equipment or even in different facilities. For example, pre-formed pouches could be produced that can be filled from an open end, and which then can be sealed.

EXAMPLE

In one example, the non-linear seal jaws 10 have a relatively low-frequency occurrence of peaks 22 and valleys 24. In this example, the depth D of the peaks 22 and valleys is about 0.25 inch and the wavelength W is approximately 2.0 inches, so that over a 5 inch section of the sealing jaws 10, there are three peaks 22 and two valleys 24. The depth D of 0.25 inch and the wavelength W of 2.0 inches amounts to 0.18 inch of extra sealing surface area per inch than a flat sealing surface per inch.

In a second example, the non-linear seal jaws 10 have a relatively high-frequency occurrence of peaks 22 and valleys 24. In this example, the depth D of the peaks 22 and valleys is approximately 0.12 inch and the wavelength W is approximately 1.0 inch, so that over a 5 inch section of the sealing jaws 10, there are five peaks 22 and five valleys 24. The depth D of 0.12 inch and the wavelength W of 1.0 inch amounts to approximately 0.16 inch of extra sealing surface area per inch than a flat sealing surface per inch.

These example non-linear seal jaws and a control traditional flat seal jaws were then used to form a cross seal in a package. Preformed bags having a width of 6 inches and side seals and an end seal of 0.375 inch. A replica stack of sliced ham having dimensions of 5.125 inches long, 3.875 inches wide, and 1.0 inch tall was placed into the bag. The open end of the bag was then fed into the seal jaws so that a seal was created approximately 0.5 inch from the replica stack.

The constant product width and height along with the bag having a constant width creates a reproducible experiment. Additionally, the amount of width difference between the seal zone and the food product zone can be calculated.

$$W_X = H_P\left(\tan\left(\cos^{-1}\left(\frac{H_P}{W_F - W_P - 2W_S}\right)\right)\right)$$

Where $H_p$ is the height of the product, $W_F$ is the width of the package, $W_P$ is the width of the product, $W_S$ is the width of the side seals, and $W_X$ is the lateral width extending between the sides of the product and the start of the side seals. $W_X$ can then be added to $W_P$ and $2W_s$ to create the package width in the product zone. This value can then be subtracted from the package width to find the width difference between the seal zone and the product zone.

$$\text{Excess\_Width} = W_F - (W_P + 2W_S + W_X)$$

In the example discussed herein, $H_p$ is 1 inch, $W_F$ is 6 inches, $W_P$ is 3.875 inches, $W_S$ is 0.375 inch, and $W_X$ is calculated to be 0.944. Accordingly, in this Example the Excess Width in the seal zone is 0.431 inch. Following this equation shows that Excess Width rises relatively exponentially with increased height of the high-profile food product when the bag remains constant.

Applied to the above described Low-Frequency Seal Jaws, the Excess Width can be tensioned within a valley-peak-valley sequence because the Low-Frequency Seal Jaws provide 0.18 inch of extra travel over an inch of linear width. Accordingly, the Excess Width is tensioned within 2.38 inches.

Applied to the above High-Frequency Seal Jaws, the Excess Width can be tensioned within three peak-valley pairs. The High-Frequency Seal Jaws provide 0.16 inch of extra travel over an inch of linear width. Accordingly, the Excess Width is tensioned within 2.69 inches.

Each example was used to create 5 seals across the bags, the results of which are set forth in the below table and following description.

| Test | Traditional Flat Seal Jaws | Low-Frequency Seal Jaws | High-Frequency Seal Jaws |
|---|---|---|---|
| 1 | 6 wrinkles; 1.5 mm max wrinkle size | Small crease on left side | Crease in center |
| 2 | 4 wrinkles; 2.5 mm max wrinkle size | No crease | Very little crease |
| 3 | 5 wrinkles; 2 mm max wrinkle size | Small indication of stretched material on far left and far right side | Very little crease |
| 4 | 3 wrinkles; 2 mm max wrinkle size | Very small indication of stretched material on fair left and far right side | Very little crease |
| 5 | 6 wrinkles; 1 mm max wrinkle size | Crease on left side, uneven end seal | Very little crease |

Traditional Flat Seal Jaws

All five samples had multiple wrinkles ranging in size from 1.0-2.5 mm in width. They were distributed randomly across the seal. The number of wrinkles is inversely proportional to the size of the wrinkles, which supports the proposition that there is a fixed amount of excess width given a constant package width and product height and width.

Low Frequency Seal Jaws

All five samples exhibited very few creases with a flat overall seal. Each sample showed small alternating stretch marks that aligned with the high and low points on the seal jaw. The depth of the valleys caused the opposite side of the film to stretch to reach the base of the valley. Accordingly, to avoid stretch marks, the valleys have a maximum depth.

High-Frequency Seal Jaws

All five samples showed very good cross seals with little to no creasing. The seals held a wavy pattern after cooling. This could be a result of too much heat or that the depth of the valleys were slightly too large when applied with a high-frequency.

The drawings and the foregoing descriptions are not intended to represent the only forms of the container and methods in regards to the details of construction. Changes in form and in proportion of parts, as well as the substitution of equivalents, are contemplated as circumstances may suggest or render expedient.

The invention claimed is:

1. A pair of mating sealing jaws for forming a seal between opposing plastic film segments, one of the pair of sealing jaws having a non-linear sealing surface with between 2 and 8 curvilinear peaks separated by curvilinear valleys and another of the pair of sealing jaws having a complementary, non-linear sealing surface, and
    wherein the lengths of the sealing surfaces result in between 0.16 and 0.18 inches of extra travel per linear inch as compared to linear sealing surfaces.

2. A pair of mating sealing jaws for forming a seal between opposing plastic film segments, one of the pair of sealing jaws having a non-linear sealing surface with between 2 and 8 curvilinear peaks separated by curvilinear valleys and another of the pair of sealing jaws having a complementary, non-linear sealing surface, and
    wherein the valleys each have a depth of between 0.09 and 0.25 inches and the peaks each have a height of between 0.09 and 0.25 inches as measured from a median line.

3. A pair of mating sealing jaws for forming a seal between opposing plastic film segments, one of the pair of sealing jaws having a non-linear sealing surface with between 2 and 8 curvilinear peaks separated by curvilinear valleys and another of the pair of sealing jaws having a complementary, non-linear sealing surface,
    wherein the non-linear sealing surfaces comprise complementary sinusoidal waves, and
    wherein the complementary sinusoidal waves have wavelengths between 1.0 and 2.5 inches.

4. The pair of mating sealing jaws of claim 3, wherein between 1.5 wavelengths and 3 wavelengths provide sufficient extra travel over a linear width to tension out all excess width within a seal zone of a package containing a high-profile food product.

5. A pair of mating sealing jaws for forming a seal between opposing plastic film segments, one of the pair of sealing jaws having a non-linear sealing surface with between 2 and 8 curvilinear peaks separated by curvilinear valleys and another of the pair of sealing jaws having a complementary, non-linear sealing surface, and wherein a depth of one of the valleys is sized such that the plastic film segment not adjacent to the valley does not have stretch marks after formation of the seal.

* * * * *